(12) United States Patent
Rozenboim

(10) Patent No.: US 9,392,232 B1
(45) Date of Patent: Jul. 12, 2016

(54) METHOD AND SYSTEM FOR VERIFICATION OF VIDEO SIGNAL VALIDITY

(71) Applicant: Leonid Rozenboim, Los Gatos, CA (US)

(72) Inventor: Leonid Rozenboim, Los Gatos, CA (US)

( * ) Notice: Subject to any disclaimer, the term of this patent is extended or adjusted under 35 U.S.C. 154(b) by 632 days.

(21) Appl. No.: 13/916,992

(22) Filed: Jun. 13, 2013

Related U.S. Application Data

(62) Division of application No. 12/794,854, filed on Jun. 7, 2010, now Pat. No. 8,971,184.

(60) Provisional application No. 61/272,067, filed on Aug. 13, 2009, provisional application No. 61/291,913, filed on Jan. 3, 2010.

(51) Int. Cl.
*H04N 7/18* (2006.01)
*G07F 17/32* (2006.01)

(52) U.S. Cl.
CPC .............. *H04N 7/181* (2013.01); *G07F 17/32* (2013.01)

(58) Field of Classification Search
CPC ....... H04N 9/8042; H04N 5/85; H04N 5/782; H04N 7/181; G07F 17/32
USPC ........ 386/200, 248, 291; 463/25, 29; 348/143
See application file for complete search history.

(56) References Cited

U.S. PATENT DOCUMENTS

| 7,454,049 | B2* | 11/2008 | Paraskevakos | G06K 9/38 382/135 |
| 7,972,213 | B2* | 7/2011 | Walker | G07F 17/32 463/16 |
| 8,460,103 | B2* | 6/2013 | Mattice | A63F 3/00157 463/16 |
| 8,477,193 | B1* | 7/2013 | Rozenboim | H04N 7/183 348/143 |
| 8,616,984 | B2* | 12/2013 | Mattice | G07F 1/06 463/25 |
| 8,684,839 | B2* | 4/2014 | Mattice | G06F 3/013 463/29 |
| 2009/0022472 | A1* | 1/2009 | Bronstein | G06K 9/00751 386/278 |
| 2009/0048908 | A1* | 2/2009 | Kaplan | G06Q 30/02 705/7.33 |
| 2012/0020641 | A1* | 1/2012 | Sakaniwa | G11B 27/105 386/230 |

* cited by examiner

*Primary Examiner* — Thai Tran
*Assistant Examiner* — Mishawn Hunter
(74) *Attorney, Agent, or Firm* — Bardmesser Law Group

(57) ABSTRACT

A system for verification of video clips, including a media player connected via a network to a media server, the media player receives a compressed video clip from the media server; a display monitor powered connected to a video player for receiving a decompressed video clip; a current sensor coupled the display monitor for measuring current consumption of the display monitor while the video clip is played; a DSP module for receiving current consumption measurement and generating a fingerprint of the clip; network storage storing log files; local storage coupled to the media player and storing known fingerprints reflecting current consumption corresponding to video clips. The DSP module sends the fingerprint to the media server; the media server stores the fingerprint in a log file on the network storage for verification of subsequent reproduction of the clip on the display monitor.

15 Claims, 5 Drawing Sheets

Camera Data Flow Diagram

METHOD AND SYSTEM FOR VERIFICATION OF VIDEO SIGNAL VALIDITY

CROSS-REFERENCE TO RELATED APPLICATIONS

This application is a divisional of U.S. patent application Ser. No. 12/794,854, filed on Jun. 7, 2010, which claims priority of a Provisional U.S. Patent Application No. 61/272,067, filed on Aug. 13, 2009 and a Provisional U.S. Patent Application No. 61/291,913, filed on Jan. 3, 2010, all of which are incorporated by reference herein in their entirety.

BACKGROUND OF THE INVENTION

1. Field of the Invention

The present invention is related to methods of video surveillance and, in particular, to a method for verification integrity and validity of live or recorded surveillance video.

2. Description of the Related Art

Video surveillance is currently one of the fastest growing applications of digital video and data networking. Conventional video surveillance systems employ CCTV (Closed Circuit Television) equipment that does not have the efficiency and security of digital technologies. However, transitioning the entire system into the digital domain often comes at an enormous cost.

Typically, digital video surveillance systems employ mainstream TCP/IP and Ethernet data communications standards, allowing to find adequate digital equivalents to the past and present analog architectures and to take advantage of the added levels of versatility that digital technology offers. The digital surveillance systems improve upon the efficiency of conventional systems and provide additional improvement in the level of security. However, digital surveillance systems impose a number of challenges that need to be addressed.

Implementation of an all-digital video security system involves finding ways to improve the system security while maintaining its affordability. However, once a digital video system becomes a key component of a physical security of a site, it can no longer be assumed that the surveillance video feeds are unaltered or not tempered with. A physical security system must be protected from tamper or sabotage without imposing additional expenses in its implementation.

Conventional video surveillance (i.e., CCTV) has been an important security tool in both private corporate and public government sectors. Video surveillance technology is currently evolving from entirely analogue systems on to hybrid analogue-digital systems and ultimately to all-digital IP-network based configurations. Conventional analogue CCTV systems consist of analogue cameras, display monitors and video cassette recorders.

In modern hybrid systems, the VCRs are replaced with a digital recording system utilizing digital components that digitize and compress the video signal and store it onto computer hard disks or other digital media. Some hybrid video surveillance systems have their display monitors fed from the digital recorders rather than from the analog source. Such a security system displays digitized video stream on the observation monitors. In this case, the digital recording system replaces the analog video routing switches, as well as the VCR.

Ultimately, the market exhibits an obvious trend towards an all-digital Internet Protocol (IP)-based network, where video digitization and compression are performed within a digital camera. The imminent transition to an all-digital IP-based digital video surveillance system has a potential for reducing equipment and maintenance costs while increasing the value of the system and providing improved security.

However, transition to an all-digital system creates new types of vulnerabilities and weaknesses that need to be identified and mitigated. For example, the following issued can affect a digital video surveillance. A deliberate attack on a security video system can include a deliberate insertion of false imagery and disabling of certain system components. The insertion of the false imagery can be performed at one of many points in the system:

(a) a still picture can be placed in front of the camera lens that resembles the observed scene, to simulate inactivity;

(b) previously recorded images that form a given scene are fed in a "loop" into the system, instead of the actual live video signal;

(c) display monitors located in the security monitoring center can be re-routed to display a pre-recorded video instead of a live video feed;

(d) a security video monitor can be reconfigured for viewing unrelated video content; and (e) a digital recording file can be replaced by a file generated before or after an intrusion event, and a time stamp of the file can be falsified so that the file seem to represent the time period of the intrusion.

Additionally, any technical malfunctions can result in some of the above scenarios. Regardless of the nature of these occurrences, they need to be detected using the same methodology. Another existing problem with surveillance or other video (i.e., such as, for example, advertising video feeds) is implementation of "proof-of-play" features. An owner of a video content needs a proof that his content has been displayed a certain number of times on several screens. Therefore, a reliable method for automatically generating the proof-of-play data for a video stream is required.

A conventional way of providing the proof-of-play is generating an audit log reflecting screen ID, video clip ID and a time of display. The main disadvantage of this method is that there is no assurance that the display connected to the media player is operational or is configured to display video stream provided by the video player.

This problem can be overcome by connection of a slow-speed auxiliary digital cable (e.g., using a serial standard RS-232) for validation that the display screen is turned on and is configured to receive the video feed from a particular video player. This method is rather complex and is not reliable, as it depends on display implementation and type and a lack of standardization in TV display manufacturing.

Another problem related to producing a reliable audit log is that the media player itself can malfunction (i.e., a video decoder can malfunction, a video scheduling module can malfunction, a compressed video file can be corrupted, etc.) and generate a false audit log indicating, for example, that the video content was displayed while no video feed was rendered to a user. Such malfunctions of the video player cannot be detected without human intervention with existing technology.

Yet another conventional method for providing the proof-of-play involves insertion of a subtle audio signal into the content's audio track. This method, however, requires sophisticated digital signal processing that must be implemented at each display screen. This produces a very costly overhead to the video system. Furthermore, the reliability of this approach is also limited. In cases when malfunction only affects the video and not the audio track, it will not be detected.

Accordingly, there is a need in the art for a cost-effective method for verification of a digital video. Such method should include inserting certain distinguishable and difficult to imitate characteristics into frames of a video signal at the earliest possible point (i.e., close to a video generation source) and performing inspection of the video stream at any subsequent point in reproduction of the video footage without system modification and deployment of additional cabling.

SUMMARY OF THE INVENTION

The present invention is related to methods of digital video surveillance and, in particular, to a method for verification integrity and validity of surveillance live or recorded video. The method, in accordance to an exemplary embodiment, employs measurements of luminosity of video display screens. A current consumption of the video display monitors in the security control room is measured at a sampling rate (slightly lower than the display frame rate or the electrical grid frequency).

The measured current display consumption is used as a measure of the total luminosity of the display screen at the time of measurement. The current consumption is either proportional or inversely-proportional to the total screen luminosity, depending on the display technology. A special software module within a digital recording unit is used to calculate an aggregate luminosity of recorded video frames. The aggregate luminosity can also be calculated on an external computer capable of reading the recorded video files. The software module produces an event notification along with a timestamp of the event whenever the frame luminosity changes between adjacent frames.

A central verification system is connected to the digital recording unit via communications network. The central verification system generates relatively small yet measurable changes in illumination of the surveyed scenes. The central verification system detects and analyses the correlated changes in display monitor's current consumption to verify that the assigned monitor is actually displaying its assigned scene.

The central verification system also generates an audit trail of the scene lighting change events it produced and an audit of the real-time display correlation events. The audit trail can be subsequently used to verify a correlation of inter-frame luminosity changes in the recorded video files with the events generated by the verification system.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
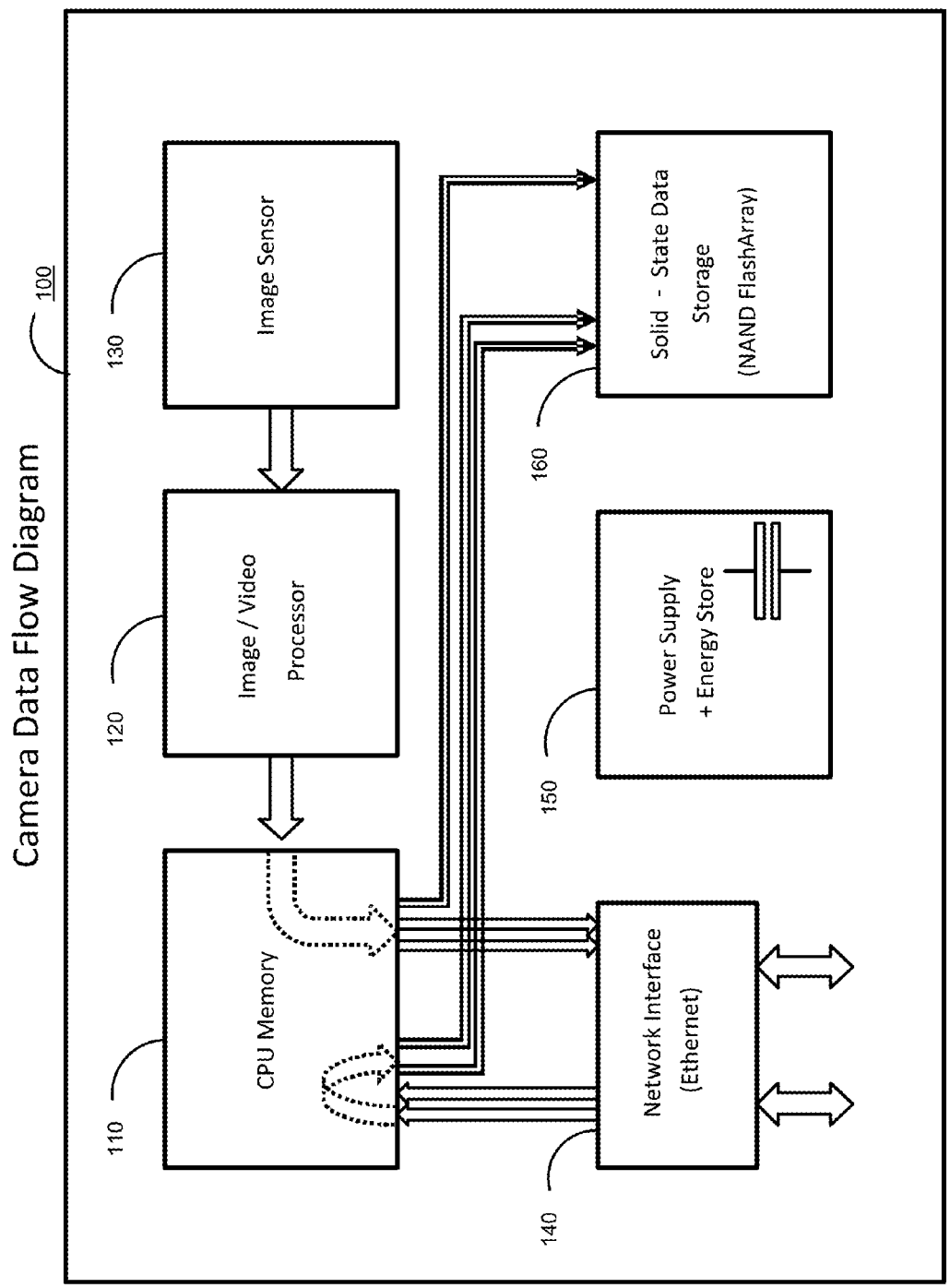
FIG. 1 illustrates a data flow diagram of an individual video camera, in accordance with the exemplary embodiment.

Reference will now be made in detail to the preferred embodiments of the present invention, examples of which are illustrated in the accompanying drawings.

In one aspect, video cameras are augmented with a light-source that can be remotely controlled to be turned on for a specified time interval. The additional light source adds a small yet detectable amount of illumination to an observed scene. Alternatively, existing lighting fixtures can be equipped with a remote control so that some of the scene lighting can be dimmed or turned off for a specified time interval, thus modifying the amount of light captured by the security camera.

A video verification method, in accordance with an exemplary embodiment, employs measurements of luminosity of video display screens. An electric current consumption of the video display monitors in the security control room is measured at a sampling rate (slightly lower than the display frame rate or the electrical grid frequency).

Then, the measured current display consumption is used as a measure of the total luminosity of the display screen at the time of measurement. The current consumption is either proportional or inversely-proportional to the total screen luminosity, depending on the display technology.

A special software module within a digital recording unit is used to calculate (optionally) an aggregate luminosity of every recorded video frame. The aggregate luminosity can also be calculated on an external computer capable of reading the recorded video files. The software module produces an event notification along with a timestamp of the event whenever the frame luminosity changes between the adjacent frames.

According to the exemplary embodiment, a central verification system is connected to the digital recording unit via a communications network (typically using enterprise-class Ethernet LAN, the same network used to carry the digitized and compressed video signal, or other similar networks). The central verification system generates subtle yet measurable changes in illumination of the surveyed scenes. The central verification system detects and analyses the correlated changes in display monitor's current consumption to verify that the assigned monitor is actually displaying its assigned scene.

The central verification system also generates an audit trail of the scene lighting change events it produced and an audit of the real-time display correlation events. The audit trail can be subsequently used to verify a correlation of inter-frame luminosity change in the recorded video files with the events generated by the verification system.

The central verification system expects that some light changes can be a result of some other causes rather than its own actions, but the central verification system may not be able to confirm it with any other electronically controlled system. However, when several cameras are pointed at adjacent scenes, any significant light change (e.g., manual lightswitch operation) will be simultaneously detected in several video streams belonging to the adjacent cameras. This can be used as an additional verification event.

The verification system must also account for a transmission delay that is inherent in digital video systems that use conventional video compression techniques as a result of network transmission latency and the video compression/decompression algorithm. According to the exemplary embodiment, the verification system is capable of measuring these delay factors during the initial operation period (or following system maintenance) along with any delay variance (i.e., jitter) present in the system, allowing for a certain margin of error in the timing of event correlation: The expected delay is a direct function of the video codec (compression/decompression module) in use, so it can be configured into the system during installation. Alternatively, the installation may be followed by a calibration time period, during which the verification system will "observe" the actual delay in the appearance of scene light changes at the different points which the system, and storing these values for subsequent use. The equipment delay calibration procedure uses the same methods as the operational mode, except that during calibration, the protected site is assumed to be secure and untampered, but during operational mode, the previously learned delay is assumed to be constant, while allowing a certain degree of variance, and the failure of a lighting even to appear at the expected delay from the time of its generation will lead to a security or malfunction alert generation.

The verification system communicates alerts to a central security system in the event of failure detection. An alarm is triggered whenever a light-change event does not result in a correlating change in the current consumption of the assigned display monitor or in the frame luminosity of a video signal received from the corresponding camera.

In case of a security system that combines several camera streams onto a single monitor or periodically rotates camera streams routing to a monitor, the video routing system communicates video routing information and any routing changes into the verification system so that the verification system can adjust its expected correlation with the actual signal routing at the time of a generated light-change event.

Aside of being able to receive video routing information and send out alert and heartbeat events to the central security system, the verification system does not need an attendant and, therefore, does not require a human interface. (Heartbeat events are designed to constantly inform the central security system that the verification subsystem is active and operational, and an absence of such events should be interpreted as malfunction or tamper alert by the central security system.) A human intervention may only be needed during the initial setup and maintenance. According to the exemplary embodiment, the video verification system is an important component of a security system. The verification system is robust and resistant to tampering, both physical and electronic.

In an alternative embodiment, a digital networked video camera that also includes an integrated light-source, can also generate a light-change event locally, affecting only the lighting of the scene it surveys. The video camera verifies the correlated change in luminosity in the video images it generates and subsequently transmits the images over a network and/or stores them into an embedded video storage subsystem.

In this scenario, the camera must also authenticate the video stream it generates with a strong cryptographic signature to protect against subsequent modification of the image or image timestamp. This embodiment uses the light-change event generation and luminosity correlation to protect the given camera against optical tampering, as well as from some variants of electronic tampering. The cryptographic signature protects the acquired video footage thereafter. This embodiment does not provide validation of the real-time display monitors, since luminosity of the display monitors is not measured and luminosity changes of the display monitors are not detected.

FIG. 1 illustrates a data flow diagram of an individual video camera, in accordance with the exemplary embodiment. The image/video processor 110 is a specialized signal processing element that acquires a continuous stream of images (i.e., frames) from the image sensor 130 located behind the camera lens. The processor 110 performs image enhancements, as well as compression of the images.

The images can be either a sequence of standalone independent images (Motion-JPEG) or a sequence of independent images (MPEG "I"-frames) and dependent images ("B", "P" frames). The image/video processor 120 stores the resulting image sequences (i.e., video stream) into the main memory of CPU 110.

The CPU 110 concurrently stores the resulting stream into the integral NAND Flash memory 160 and transmits several copies of the same stream to several cameras attached to the same local area network via network interface 140. At the same time, the CPU 110 receives the incoming data streams from the other cameras on the network via the network interface 140 and proceeds to store the received streams onto its integrated NAND Flash storage 160.

Figure 2:
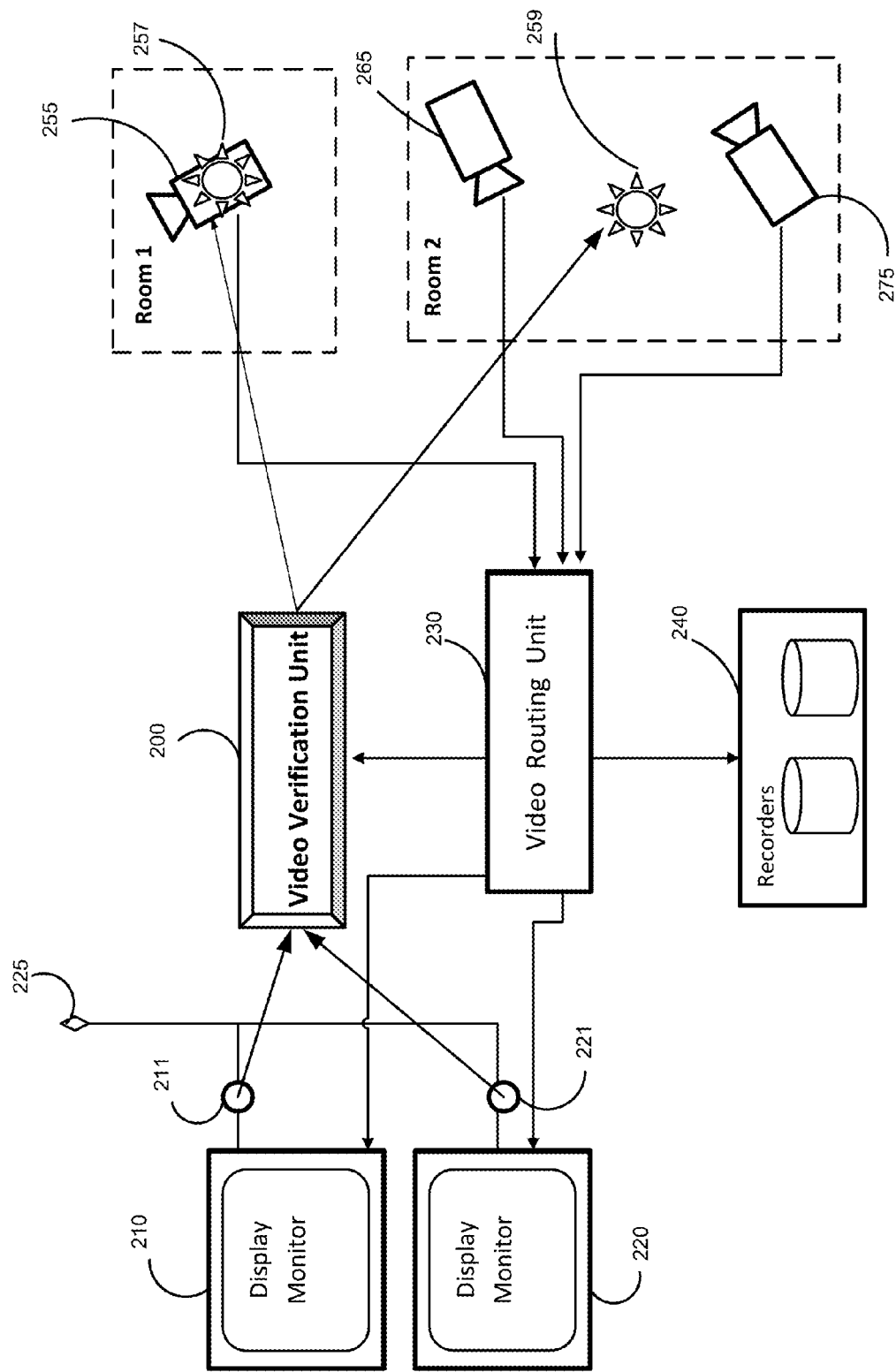
FIG. 2 illustrates a video verification system, in accordance with the exemplary embodiment.

FIG. 2 illustrates a video verification system, in accordance with the exemplary embodiment. Room 1 is covered by a single camera 255 with an integral light source 257. Room 2 is covered by two cameras 265 and 275 with complementing fields of view and a controlled external light source 259. A security monitoring center is equipped with two monitors 210 and 220.

A video routing unit 230 in analogue CCTV system is an external appliance as shown in FIG. 2. In the digital domain, the video routing unit 230 is a functional block embedded into cameras, recorders and video decoders connected to the monitors 210 and 220. The video routing unit 230 routes the video signal from the cameras 255, 265 and 275 to the monitors 210 and 220 and recorders 240. The video routing functionality directs each camera stream to a particular recorder. The routing functions also controls which cameras are visible on which observation monitors. A large number of camera streams is typically directed into fewer observation monitors by means of displaying multiple (scaled down) video pictures on a single screen, time-wise rotation of several camera streams or a combination of both of the above methods, in a predetermined or manually controller manner. Although the routing functionality is implemented in software on digital video systems, and is not residing in a specific physical unit, its relationship with the verification system is better clarified by regarding the routing functionality as a distinct functional block.

The video routing unit 230 also controls how the monitors are shared among several cameras. In the exemplary embodiment, the video routing unit 230 feeds data reflecting monitor-camera association to a verification unit 200. The monitors 210 and 220 are also augmented with current consumption data acquisition units 211 and 221. The units (i.e., sensors) 211 and 221 provide the current consumption samples to the verification unit 230.

Lighting (i.e., illumination)-change events are generated by the verification unit 230, by sending commands to change the light intensity to the external controlled light source 259 in the Room 2 and to the light source 257 embedded in the camera 255 in the Room 1. As video signal traverses the system to reach the observation monitors 210 and 220, the verification unit 230 anticipates an appropriate change in current consumption to correlate with the light-change events it generates.

The verification unit 230 stores the light-event audit trail into the recorders 240. The verification unit 230 is connected to a central security system (not shown) for generation of an alarm. Those skilled in the art will appreciate that the exemplary embodiment, advantageously, provides for efficient and cost effective verification of the surveillance video.

The system depicted in FIG. 2 uses a current consumption value rather than measurements of direct light intensity. Note that measuring of the current consumption is much more practical due to the ease of installation of the sensors and complete immunity to influence of unrelated light sources. The main detractor in measurements of the current consumption as the indication of the luminance is the low-pass filtering produced by various ripple and noise filters used in power supply 225. Therefore, in the exemplary embodiment, when current is measured, only the frequencies below the frame rate of the video signal are taken into consideration (i.e., the signal bandwidth is below at least 5 Hz and preferably below 1 Hz).

According to the exemplary embodiment, a most compact signature of the luminance signal is generated. In order to produce the luminance signature, most of the disturbances, such as offset and gain, that are different for different monitors, are ruled out. This is accomplished by collecting samples of current consumption and converting them into the frequency domain. For example, at sampling rate 100 Hz (in Europe) and 120 Hz (in US), a frame duration of 5 seconds equates to 500 points at 100 Hz.

The sample rate is selected to be a multiple of the power grid for a number of reasons. If the TV display is AC-powered, each sample contains an integral half-cycle, thus representing a true-RMS value. If the display is DC-powered, selecting the sampling rate aligned to the power grid allows for very effective filtering of power-induced noise.

Alternatively, the sample can be subjected to a low-pass filter with 15 Hz pole, and then converted to frequency domain using either Fast Fourier (FFT) or Discrete Sine (DCT) Transform. The transformed sample batch needs to be normalized and reduced to eliminate non-significant components.

According the exemplary embodiment, the resulting data set can be used as digital fingerprint of a certain 5-second portion of a video clip. The fingerprint can be compared to a known fingerprint of a video component scheduled to be played on a given display. Fingerprint comparison can be implemented using common pattern-matching algorithms, such as, for example, least squares method (or another pattern matching mechanism). The match can be reflected by a real number indicating the likelihood of a match that can be simply calculated as a geometrical difference between two vectors—the transformed sample batch and a prototype fingerprint (i.e., a known fingerprint) for the video content being played.

The prototype signatures can be produced in one of two ways—programmatically or empirically. A compressed video clip stored in a computer file can be analyzed by a software module. The software module will decompresses each video frame and calculate an average luminance of that frame. Then, the luminance values are stored in a sample batch and transformed into the frequency domain. This is a very precise automated method that produces the cleanest fingerprint result. However, developing the software module presents a significant cost overhead.

Alternative method uses the fingerprint samples derived from current measurements and transformations of the same video content played on multiple displays. The fingerprints acquired from the different displays can be consolidated so that the fingerprint signal is amplified and noise is attenuated by a combination of a number of samples.

In case when a single video clip is rendered on a large number of displays, the fingerprint from each display can be compared against an average fingerprint aggregated from all the displays. Thus, any abnormal fingerprints will likely represent failed displays, malfunctioning media player software or attempts to tamper with the video content.

Figure 3:
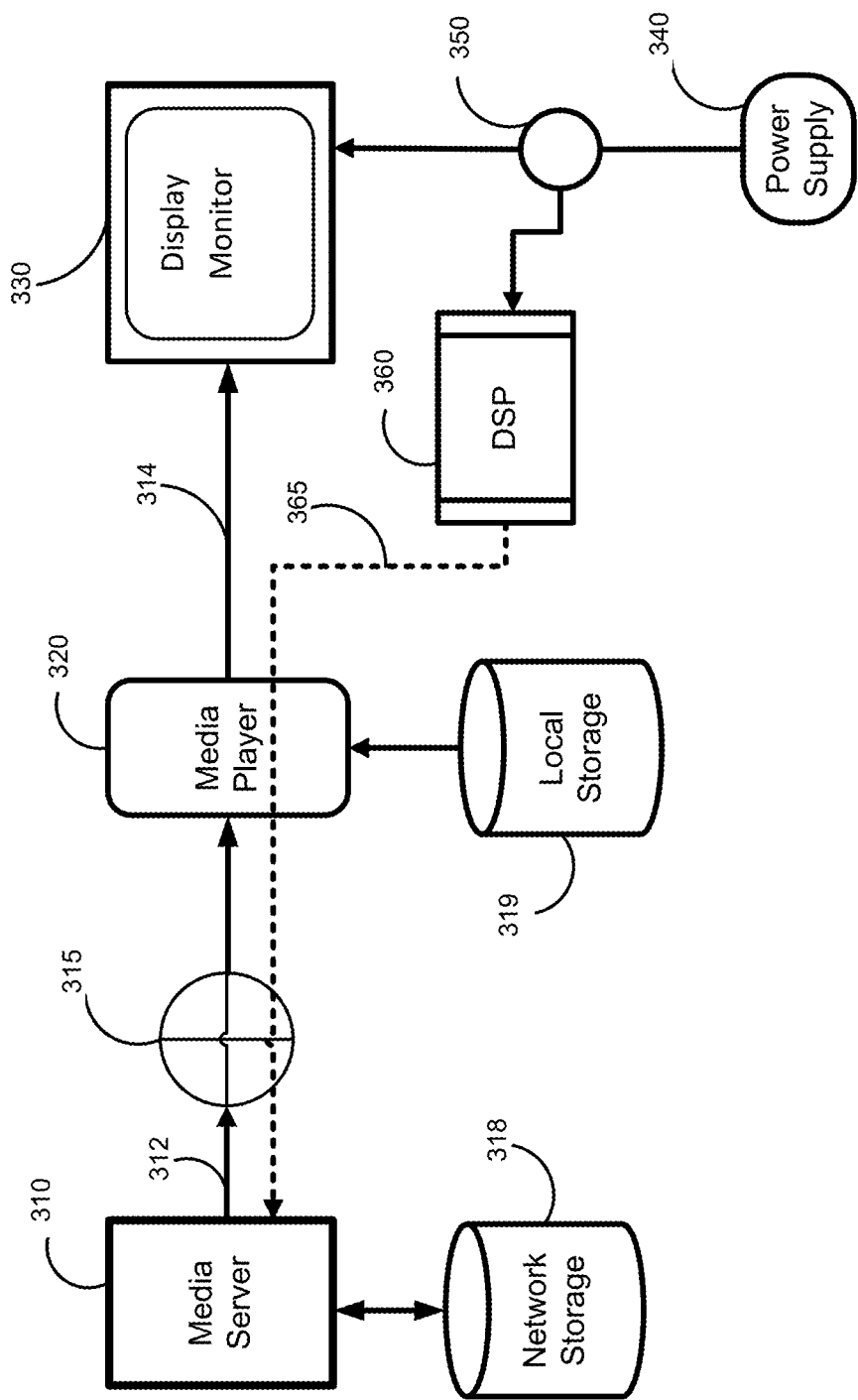
FIG. 3 illustrates an example of verification of a video clip presented on several displays.

FIG. 3 illustrates an example of verification of a video clip presented on several displays. A media player 320 receives compressed video 312 from a media server 310 and sends decoded decompressed video 314 to a video display monitor 330. At the same time the media player 320 measures the current consumption (i.e., a consumption fingerprint) by the video display monitor 330 using a current sensor 350. The current sensor 350 can be a simple current shunt or a Hall Effect sensor for DC-powered monitors, or a current transformer for AC-powered monitors.

The measured current value is provided to a digital signal processing module 360. The module 360 can be implemented as a software module deployed on a microprocessor of the media player 320. The media player 320 has an analogue input and an Analogue-to-Digital Converter (ADC) for low speed applications. A resulting fingerprint data 365 is transmitted to a media server 310 over network 315. The media server 310 stores the fingerprint data 365 into a log file located on network storage 318. Alternatively, the fingerprint data 365 can be immediately compared against a known fingerprint data located on a local storage 319 corresponding to the video clip being played on the monitor 330.

Then, only the result of comparison and the time stamp are recorded into the audit log file located on the network storage 318. The choice between instant or deferred fingerprint matching depends on implementation (i.e., availability of computer resources on the media server 310. Note that verification of the fingerprints on the media player 320 is not recommended as it makes the results less trustworthy, since the verdict is generated by the same entity that is being audited.

Those skilled in the art will appreciate that the exemplary embodiment, advantageously, provides for efficient and cost effective verification of the video content using the luminosity-based fingerprints. The fingerprint-based verification of the video content can be also used for automatic detection of pirated video content, since pirated video footage does not have luminosity-based fingerprints.

Figure 4:
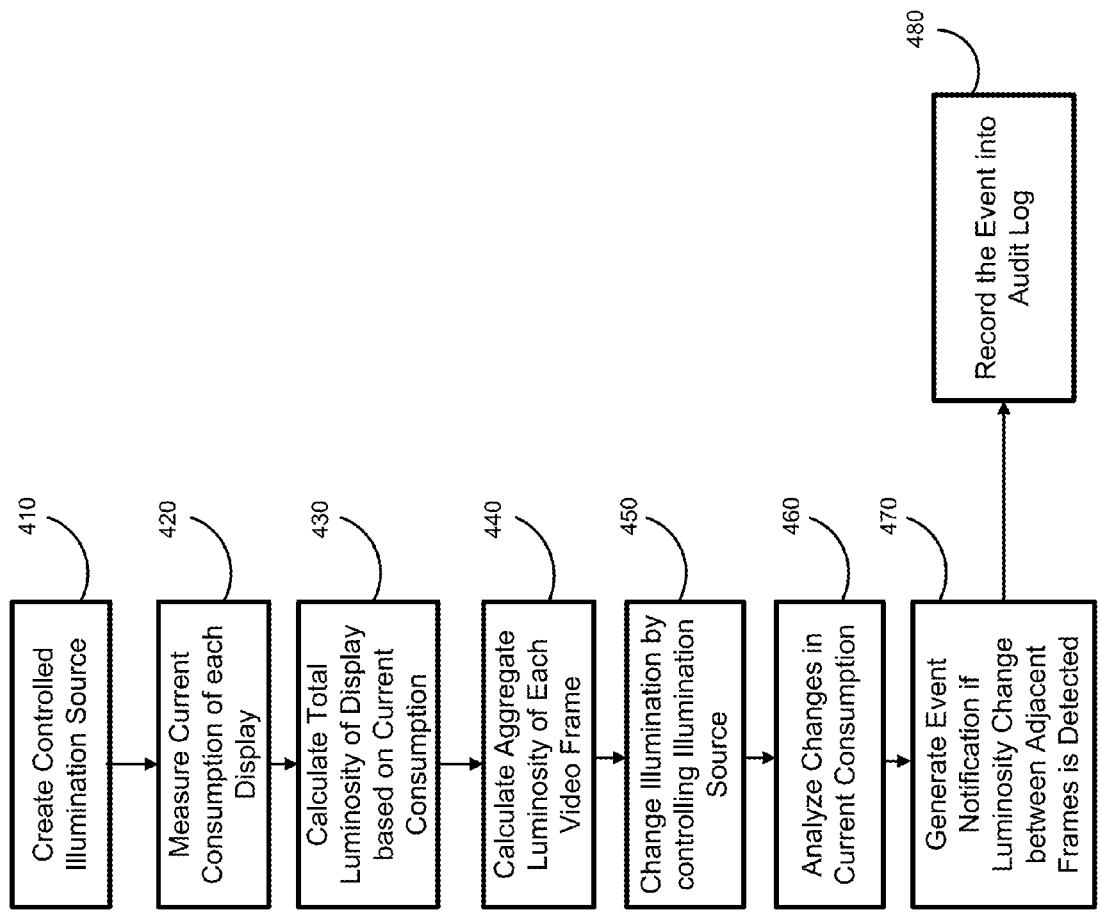
FIG. 4 illustrates a block diagram of a method for video verification, in accordance with the exemplary embodiment.

FIG. 4 illustrates a block diagram of a method for video verification. In step 410, a special controlled illumination source is added to a video camera or to a light source in the area under video surveillance. Current consumption is measured on each of the video displays in step 420. In step 430, a total luminosity for displays is calculated based on current consumption (the current consumption is either proportional or inversely-proportional to the total screen luminosity, depending on the display technology).

In step 440, an aggregate luminosity of every recorded video frame is calculated. A subtle yet measurable change in illumination of the surveyed area is generated in step 450. Correlated changes in display monitor's current consumption are analyzed in step 460. If luminosity change between adjacent video frames is detected in step 460, the event notification is generated in step 470 and the event is recorded into an audit log in step 480. The audit log can be subsequently used to verify a correlation of inter-frame luminosity change in the recorded video files with the events generated by the verification system.

Figure 5:
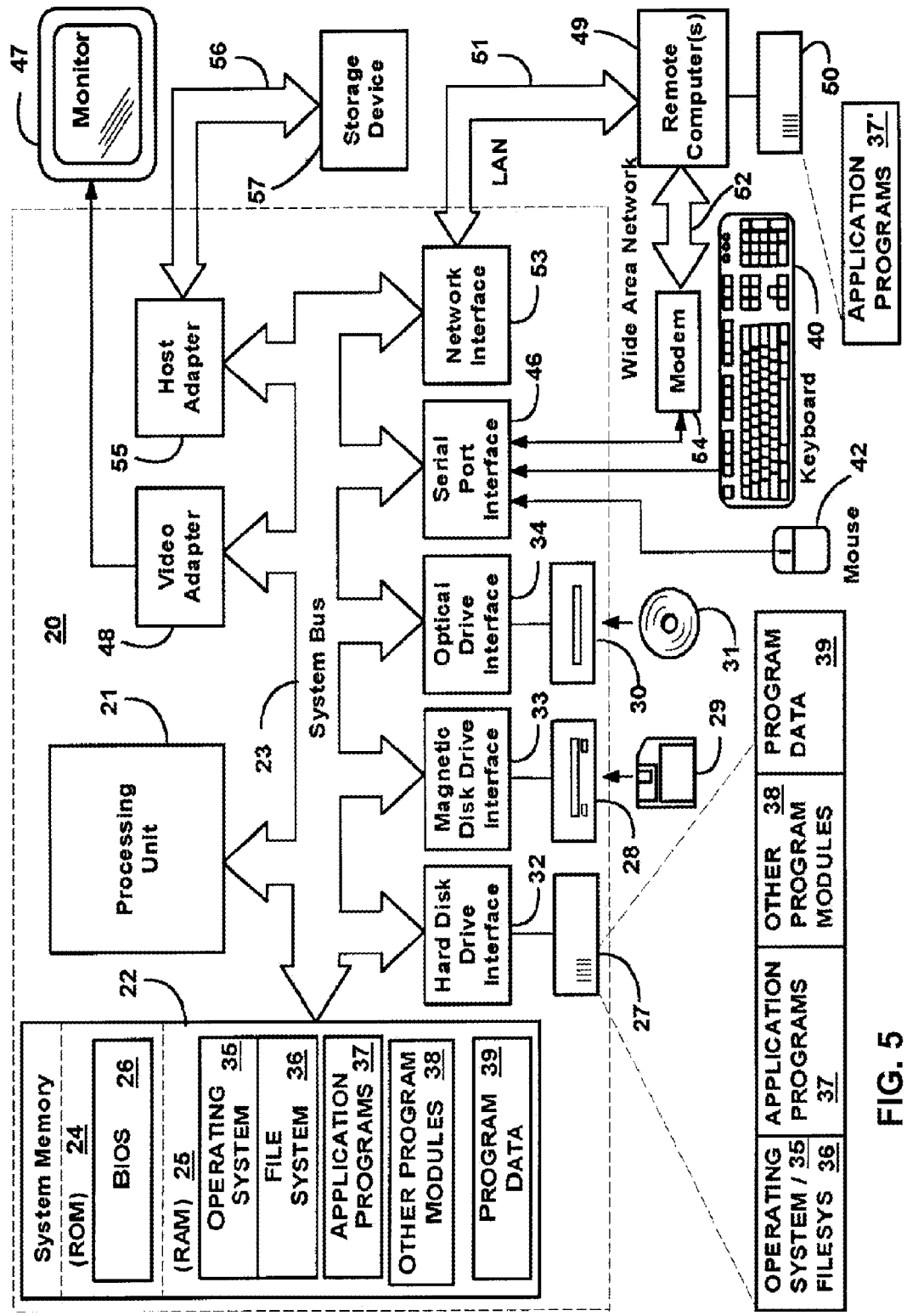
FIG. 5 illustrates a schematic of an exemplary computer system or server that can be used for implementation of the invention.

With reference to FIG. 5, an exemplary system used in the invention includes a general purpose computing device in the form of a computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed method provides for an effective verification of a video signal without employing additional hardware and cabling.

It should also be appreciated that various modifications, adaptations and alternative embodiments thereof may be made within the scope and spirit of the present invention. The invention is further defined by the following claims.

What is claimed is:

1. A system for verification of video surveillance clips, the system comprising:
   a media player connected via a network to a media server, the media player receiving a compressed video surveillance clip from the media server;
   a display monitor powered by a power supply and connected to a video player for receiving a decompressed video surveillance clip from the video player;
   a current sensor coupled the display monitor for measuring electric current consumption of the display monitor while the decompressed video surveillance clip is played;
   a digital signal processing module for receiving electric current consumption measurement from the current sensor and generating a fingerprint of the video surveillance clip;
   a network storage coupled to the media server and storing log files;
   a local storage coupled to the media player, the local storage storing known fingerprints reflecting electric current consumption corresponding to the video surveillance clips,
   wherein:
   the digital signal processing module sends the fingerprint to the media server;
   the media server stores the fingerprint in a log file on the network storage for verification of subsequent reproduction of the video surveillance clip on the display monitor.

2. The system of claim 1, wherein the fingerprint is provided to the media player by the digital signal processing unit.

3. The system of claim 2, wherein the fingerprint is compared against known fingerprints located on the local storage.

4. The system of claim 3, wherein a result of comparison of the fingerprints and a time stamp are stored into the log file.

5. The system of claim 1, wherein the decompressed video surveillance clip is received from a digital video camera equipped with a controllable illumination source.

6. The system of claim 5, further comprising a verification unit that controls the illumination source and generates illumination change events.

7. The system of claim 6, wherein:
the verification unit detects changes in the display monitor electric current consumption triggered by the illumination change events;
the verification unit stores an audit log of the illumination change events; and
the verification unit generates an alarm if the electric current consumption does not correlate to the illumination change events.

8. The system of claim 6, wherein the controllable illumination source is external to the digital video camera.

9. The system of claim 6, further comprising a video routing unit providing display monitor-digital video camera association data to the verification unit.

10. The system of claim 6, wherein the verification unit calculates luminosity of video frames based on electric current consumption samples.

11. The system of claim 6, wherein the verification unit compares luminosity of adjacent video frames after issuing the illumination change event.

12. The system of claim 6, wherein the verification unit employs pattern-matching algorithms for comparison of adjacent frames.

13. The system of claim 12, further comprising comparing luminosity of the adjacent video frames after the illumination change of the illumination source.

14. The system of claim 13, wherein the comparing of the adjacent video frames employs a pattern-matching algorithm.

15. The system of claim 1, wherein the fingerprint is derived from a number of the electric current consumption measurements produced by the video surveillance clip played on different display monitors.

* * * * *